(12) United States Patent
Shulyak et al.

(10) Patent No.: US 11,782,845 B2
(45) Date of Patent: Oct. 10, 2023

(54) FAULTING ADDRESS PREDICTION FOR PREFETCH TARGET ADDRESS

(71) Applicant: Arm Limited, Cambridge (GB)

(72) Inventors: Alexander Cole Shulyak, Austin, TX (US); Joseph Michael Pusdesris, Austin, TX (US); Abhishek Raja, Austin, TX (US); Karthik Sundaram, Austin, TX (US); Anoop Ramachandra Iyer, Austin, TX (US); Michael Brian Schinzler, Round Rock, TX (US); James David Dundas, Austin, TX (US); Yasuo Ishii, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/541,007

(22) Filed: Dec. 2, 2021

(65) Prior Publication Data
US 2023/0176979 A1 Jun. 8, 2023

(51) Int. Cl.
*G06F 12/1027* (2016.01)
(52) U.S. Cl.
CPC ................ *G06F 12/1027* (2013.01)
(58) Field of Classification Search
None
See application file for complete search history.

(56) References Cited

U.S. PATENT DOCUMENTS

| 2003/0126371 | A1* | 7/2003 | Venkatraman | G06F 9/3842 712/E9.05 |
|---|---|---|---|---|
| 2017/0161194 | A1* | 6/2017 | Loh | G06F 12/1063 |
| 2017/0344483 | A1* | 11/2017 | Shwartsman | G06F 12/0862 |
| 2019/0012271 | A1* | 1/2019 | Avoinne | G06F 12/145 |
| 2020/0327071 | A1* | 10/2020 | Arcangeli | G06F 12/12 |
| 2022/0100395 | A1* | 3/2022 | Kim | G06F 3/0653 |

* cited by examiner

*Primary Examiner* — Stephanie Wu
(74) *Attorney, Agent, or Firm* — NIXON & VANDERHYE P.C.

(57) ABSTRACT

An apparatus comprises memory management circuitry to perform a translation table walk for a target address of a memory access request and to signal a fault in response to the translation table walk identifying a fault condition for the target address, prefetch circuitry to generate a prefetch request to request prefetching of information associated with a prefetch target address to a cache; and faulting address prediction circuitry to predict whether the memory management circuitry would identify the fault condition for the prefetch target address if the translation table walk was performed by the memory management circuitry for the prefetch target address. In response to a prediction that the fault condition would be identified for the prefetch target address, the prefetch circuitry suppresses the prefetch request and the memory management circuitry prevents the translation table walk being performed for the prefetch target address of the prefetch request.

16 Claims, 7 Drawing Sheets

FAULTING ADDRESS PREDICTION FOR PREFETCH TARGET ADDRESS

BACKGROUND

Technical Field

The present technique relates to the field of data processing. More particularly, it relates to prefetching.

Technical Background

Prefetching is a technique used by a data processing apparatus to mitigate against the latency associated with memory access, by initiating the retrieval of data values or instructions from memory before the data processing apparatus encounters the corresponding requests for those data values to be loaded or instructions to be fetched.

SUMMARY

At least some examples of the present technique provide an apparatus comprising:

memory management circuitry to perform a translation table walk for a target address of a memory access request and to signal a fault in response to the translation table walk identifying a fault condition for the target address;

prefetch circuitry to generate a prefetch request to request prefetching of information associated with a prefetch target address to a cache; and faulting address prediction circuitry to predict whether the memory management circuitry would identify the fault condition for the prefetch target address if the translation table walk was performed by the memory management circuitry for the prefetch target address; in which:

in response to the faulting address prediction circuitry predicting that the memory management circuitry would identify the fault condition for the prefetch target address if the translation table walk was performed for the prefetch target address, the prefetch circuitry is configured to suppress the prefetch request and the memory management circuitry is configured to prevent the translation table walk being performed for the prefetch target address of the prefetch request.

At least some examples of the present technique provide a method comprising:

generating a prefetch request to request prefetching of information associated with a prefetch target address to a cache;

predicting whether a fault condition would be identified for the prefetch target address if a translation table walk was performed for the prefetch target address; and in response to a prediction that the fault condition would be identified for the prefetch target address if the translation table walk was performed for the prefetch target address, suppressing the prefetch request and preventing the translation table walk being performed for the prefetch target address of the prefetch request.

At least some examples of the present technique provide a non-transitory computer-readable medium to store computer-readable code for fabrication of an apparatus comprising:

memory management circuitry to perform a translation table walk for a target address of a memory access request and to signal a fault in response to the translation table walk identifying a fault condition for the target address;

prefetch circuitry to generate a prefetch request to request prefetching of information associated with a prefetch target address to a cache; and faulting address prediction circuitry to predict whether the memory management circuitry would identify the fault condition for the prefetch target address if the translation table walk was performed by the memory management circuitry for the prefetch target address; in which:

in response to the faulting address prediction circuitry predicting that the memory management circuitry would identify the fault condition for the prefetch target address if the translation table walk was performed for the prefetch target address, the prefetch circuitry is configured to suppress the prefetch request and the memory management circuitry is configured to prevent the translation table walk being performed for the prefetch target address of the prefetch request.

Further aspects, features and advantages of the present technique will be apparent from the following description of examples, which is to be read in conjunction with the accompanying drawings.

DESCRIPTION OF EXAMPLES

Figure 1:
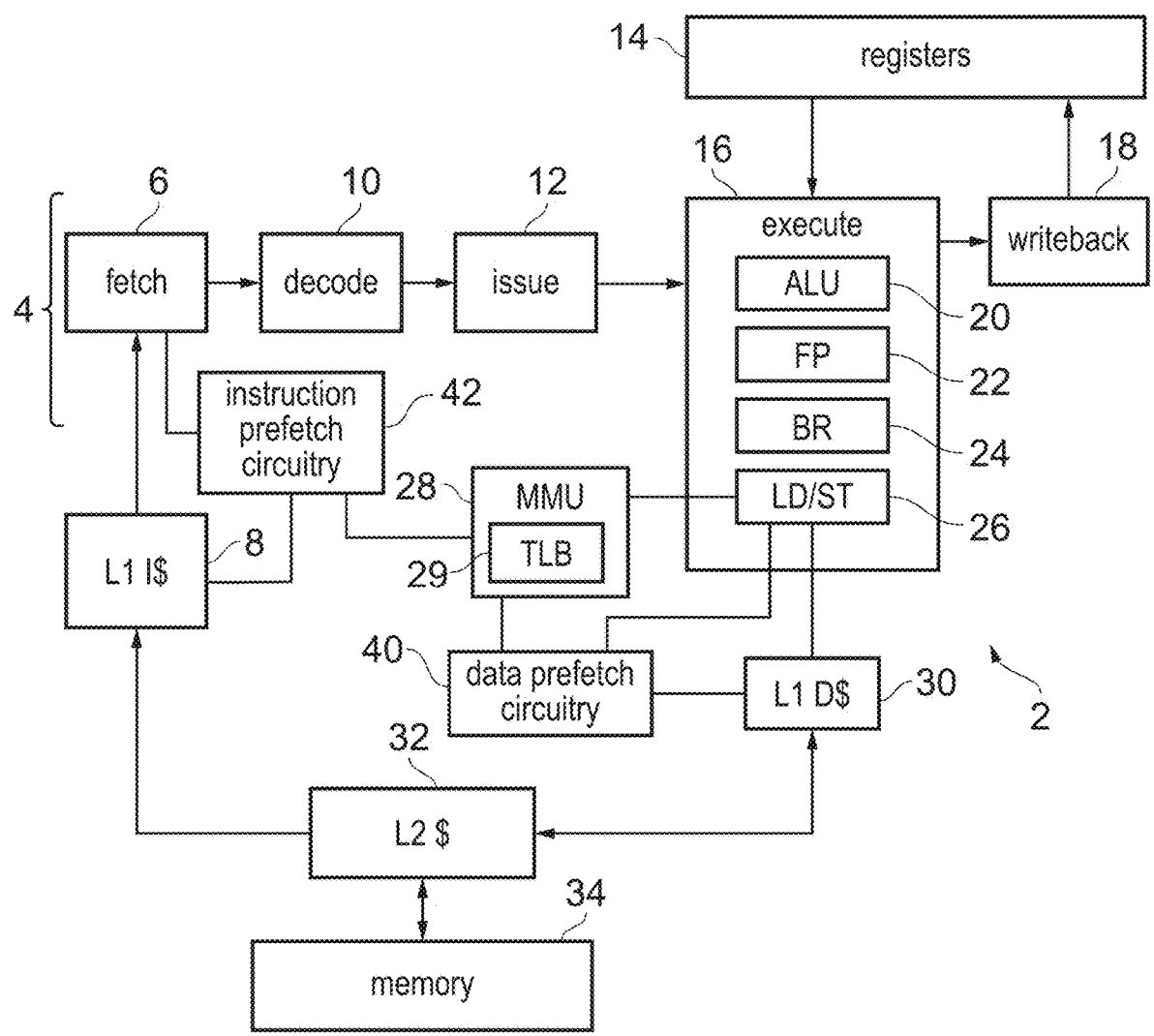
FIG. 1 illustrates an example of a data processing apparatus.

An apparatus has memory management circuitry to perform a translation table walk for a target address of a memory access request and to signal a fault in response to the translation table walk identifying a fault condition for the target address, and prefetch circuitry to generate a prefetch request to request prefetching of information associated with a prefetch target address to a cache. The translation table walk is a process for obtaining from memory information associated with a corresponding memory region including the target address. For example, the obtained information may include an address translation mapping and/or control parameters (e.g. access permissions and/or attributes) for controlling access to memory. The translation table walk may include multiple memory accesses to traverse multiple levels or stages of translation table structure to locate the entry that provides the address translation mapping and/or control parameters corresponding to the target address. Sometimes, the translation table walk may cause a fault condition to be identified, and if so then the memory management circuitry can signal a fault.

Prefetch circuitry can be useful to improve performance by prefetching information (e.g. data or instructions) into a cache in advance of the point of program flow at which the information is actually required, based on a prediction of the addresses likely to be accessed for data accesses or instruction fetches in future. This makes it more likely that when the information is actually required, the requests for that information hit in the cache, reducing the delay of accessing the information.

However, sometimes the prefetch circuitry may generate a prefetch request specifying a prefetch target address for which the memory management circuitry performs a translation table walk and identifies that a fault condition arises for the prefetch target address. The inventors have recognised that this can significantly waste resource both in the prefetch circuitry and in the memory management circuitry, as well as wasting memory bandwidth in processing unnecessary requests at the memory system. This is particularly a problem because often, for an address associated with a fault condition, the memory management circuitry may need to perform a relatively large number of memory accesses within a translation table walk process before the fault condition can be identified, and these translation table walk memory accesses can consume a lot of memory bandwidth which could otherwise have been used for more useful memory accesses, delaying those other accesses from being processed.

In the examples discussed below, the apparatus is provided with faulting address prediction circuitry to predict whether the memory management circuitry would identify the fault condition for the prefetch target address if the translation table walk was performed by the memory management circuitry for the prefetch target address. In response to the faulting address prediction circuitry predicting that the memory management circuitry would identify the fault condition for the prefetch target address if the translation table walk was performed for the prefetch target address, the prefetch circuitry suppresses the prefetch request and the memory management circuitry prevents the translation table walk being performed for the prefetch target address of the prefetch request. Hence, this reduces wastage of resource expended at the prefetch circuitry and the memory management circuitry, and saves memory bandwidth by not unnecessarily issuing a large number of translation table walk memory access requests during a walk performed for an address which would fault. This helps to improve performance because the prefetch resource, memory management resource, and memory bandwidth available can be conserved for use by other requests.

Although there can also be other use cases, this approach can be particularly helpful in cases where software has reserved a region of invalid memory address space after the memory region allocated for a buffer data structure, program code function, or other information structure being processed, to provide protection against buffer overrun for example. The prefetch circuitry may use stride prediction or another prediction mechanism to predict the addresses to be accessed in future based on a previously seen pattern of memory accesses, but may not be able to detect when the end of the structure has been reached, and so may continue to predict that future memory accesses may be required for addresses within the invalid region of address space located after the end of the structure. Hence, it can be reasonably likely there will be some prefetch requests generated for invalid addresses which relate to unmapped memory not having a valid translation table entry defined, which would cause a fault to be identified by the memory management circuitry if the translation table walk was performed. By providing the faulting address prediction circuitry, these occurrences can be predicted in advance without actually needing to perform a translation table walk, so that the corresponding prefetch request can be dropped without incurring the full cost of many memory accesses within a translation table walk.

The fault condition identified for a target address by the memory management circuitry can be any of a range of different fault types. For example, the fault condition can be any one of: a translation fault indicative of a translation table entry corresponding to the target address being invalid; an address range fault indicative of the target address being outside an allowable range of addresses; and an access indicator fault indicative of a valid translation table entry corresponding to the target address specifying an access indicator in a predetermined state indicating that no previous accesses have been made to a corresponding page of addresses since the access indicator was set to the predetermined state. The address range fault can be useful to allow a non-allowable range of addresses to be reserved for other purposes other than representing accessible memory. The access indicator fault can be useful to allow operating system software to detect information about which regions of memory have been accessed. The access indicator fault generated when the access indicator indicates that no previous accesses have occurred may be a trigger for software to update the access indicator to a different state indicating that at least one access has occurred. Periodically the software can check the access indicators for a number of regions of memory to be monitored, to check which regions have been accessed, and increment an access frequency tracking data structure accordingly. This can be useful for software making decisions on paging out of data to external storage, for example. It will be appreciated that other types of fault, other than the translation fault, address range fault and access indicator fault, are also possible.

It is not essential that the faulting address prediction circuitry is provided with the ability to predict every type of fault that may arise when the memory management circuitry processes a memory access request for a given address. In some instances the faulting address prediction circuitry may only attempt to predict occurrence of a certain subset of fault types.

The apparatus can comprise processing circuitry to process instructions according to an instruction set architecture. Memory access requests can be issued by the processing circuitry based on the processing of the instructions. For example the memory access request may include instruction fetch requests and data access requests.

In one example, the processing circuitry processes instructions according to an instruction set architecture (ISA) specifying that the memory management circuitry is prohibited from caching, in a translation lookaside buffer (TLB), a translation table entry that causes the fault condition to be identified in the translation table walk. An ISA may prohibit caching of translation table entries that cause a fault condition to be identified (at least for certain types of faults, such as the translation fault, address range fault and access indicator fault mentioned above). By doing so, changes to translation table entries in memory or other access control attributes that result in a given address changing from non-faulting to faulting (such as making valid a previously invalid region of memory, changing a boundary or size of the allowable range of addresses used to check the address range fault, or updating the access indicator in a translation table entry) do not require a TLB invalidation to be performed, which can be useful for performance because such events (especially the allocation of new valid regions of memory and the update of the access indicator) can be relatively common. Hence, as the ISA may prohibit caching of faulting translation table entries within a TLB of the memory management circuitry, this means that the memory management circuitry cannot identify whether one of these faults occurs based on cached information within the TLB and so in the case when a prefetch request specifies the prefetch target address which ultimately is determined to cause a fault, this will be determined by the memory management circuitry by performing a translation table walk (rather than merely a TLB lookup), which as discussed above can be relatively costly because it may require a large number of memory accesses to obtain many translation table entries in multiple stages and/or levels of translation tables. Hence, the ability to predict faulting addresses in advance for the purpose of suppressing prefetch requests to those addresses can be particularly useful in a system where the processing circuitry supports an ISA which prohibits caching in a TLB of translation table entries causing the fault condition to be identified, because it is very likely that if a faulting address can be correctly predicted, this will allow a relatively large number of translation table walk accesses to be eliminated.

The apparatus may have a faulting address filter structure comprising a plurality of filter entries, each filter entry storing a tracking indication for a corresponding subset of addresses. The faulting address prediction circuitry can predict whether the memory management circuitry would identify the fault condition for the prefetch target address, based on whether a lookup of the faulting address filter structure for the prefetch target address identifies a hit condition for the prefetch target address. Hence, by storing tracking indications for a certain subset of addresses predicted to cause a fault, the faulting address prediction circuitry can predict whether a certain prefetch target address is likely to cause a fault without actually needing the memory management circuitry to perform a translation table walk. This can greatly improve performance. The tracking indications can be maintained based on previously detected faults identified during translation table walks.

It may seem counterintuitive to allow a faulting address filter structure to retain information tracking addresses which caused a fault, when as mentioned above the ISA may prohibit caching of translation table entries that cause a fault condition to be identified. However, the inventors have recognised that the use of the faulting address filter structure to retain information on faulting addresses can be permitted despite the ISA restriction on TLB caching of this information, because prefetch requests (unlike the actual demand memory access requests issued by the processing circuitry based on the requirements of the executed software) can freely be issued or suppressed without affecting the correctness of processing of the software being executed. If a prefetch request is unnecessarily issued when it turns out to relate to an address which causes a fault condition to be identified, then this merely harms performance but does not affect the correctness of processing. Similarly, if a prefetch request is unnecessarily suppressed due to an incorrect prediction of whether the fault condition would have arisen for the prefetch target address, this may merely be a lost opportunity to improve performance by prefetch and useful information, which again does not affect the correct processing because the subsequent demand memory access may later request the information and if this request misses in a cache then the information can be fetched at that time. Hence, it is feasible (and useful for performance) to allow a filter structure to track information about addresses previously identified as faulting for the purpose of controlling whether prefetch requests are issued, even if this would not be allowed by the ISA for handling the demands memory access requests.

The memory management circuitry may have a TLB for caching information derived from translation table entries obtained from the translation table structure stored in the memory system.

In some examples, the control over whether the prefetch request is suppressed or not based on the faulting address prediction may depend on the lookup in the faulting address filter structure (but not on a TLB lookup), so that if a hit condition is detected in the lookup of the faulting address filter structure for the prefetch target address, then the prefetch request is suppressed and if a miss in the faulting address filter structure is detected then the prefetch request is allowed. In that case, a lookup of the prefetch target address in a TLB of the memory management circuitry may be performed in the case when the prefetch target address misses in the faulting address filter structure, but the TLB lookup can be suppressed if the prefetch target address hits in the faulting address filter structure.

However, in other examples whether or not the prefetch request is suppressed could also depend on a TLB lookup performed by the memory management circuitry for the prefetch target address.

It may be that, since tracking information has been allocated the faulting address filter structure, there has been a change to the underlying translation table structure or memory management control parameters (such as making valid a previously invalid page of the address space, changing the boundaries of the allowable address range, or updating access indicators for one or more regions of memory) which may mean that the TLB may now store an entry which would permit an access to the prefetch target address to occur without a fault arising, and so the tracking indication recording that the prefetch target address was previously identified as faulting within the faulting address filter structure may become out of date. As mentioned above, in ISAs which prohibit caching of information about faulting addresses in a TLB (for at least some fault types), there would be no need for a TLB invalidation when such changes occur, and so there may be no explicit event detectable by the faulting address prediction circuitry (or associated faulting address filter structure updating circuitry for updating the filter structure) that would allow detection of out of date information in the faulting address filter structure. Therefore, there is the possibility that sometimes there may be a false hit in the faulting address filter structure, when an address is predicted as faulting even though if the translation table walk had been performed the address would not have caused a fault. By controlling whether the prefetch request is suppressed based on the TLB lookup, then in cases where the TLB lookup hits and the faulting address filter lookup also hits, the faulting address filter lookup hit can be detected as a false hit and so the prefetch request can still be allowed to proceed (and in that case, as there was a hit in the TLB, no translation table walk is needed in any case). This can reduce the likelihood of prefetch requests being suppressed unnecessarily due to false hits in the faulting address filter structure.

Hence, in this particular example, if the prefetch target address hits in the faulting address filter structure but misses in the TLB then the prefetch request can be suppressed. If the prefetch target address hits in the TLB then the prefetch request can be allowed to proceed regardless of whether the look up of the faulting address filter structure identifies a hit or miss condition for the prefetch target address (and if a hit condition is identified for the prefetch target address in the faulting address filter structure, also the corresponding entry of the faulting address filter structure could be cleared or invalidated).

The apparatus may have faulting address filter structure updating circuitry to set, in response to the memory management circuitry identifying the fault condition for a given target address, a given filter entry corresponding to the given target address to indicate that the hit condition would be satisfied for the given target address. Hence, the apparatus learns from previously identified faults by recording in the faulting address filter structure tracking information that can be used to identify the address which cause the fault, and this can be used to form predictions of whether subsequent prefetch requests are likely to trigger a fault if a translation table walk was performed.

The faulting address filter structure updating circuitry could invalidate or clear at least a given filter entry of the faulting address filter structure corresponding to a given target address in response to at least one of: the memory management circuitry performing the translation table walk for the given target address when the fault condition is not identified; and the memory management circuitry detecting a hit in a translation lookaside buffer (TLB) for the given target address. If no fault is identified in the translation table walk for a given address previously predicted in the given filter entry as causing a fault, it can be useful to maintain the faulting address filter structure to be more up to date by invalidating the entry no longer found to cause a fault, increasing the likelihood of higher prediction success rate. Sometimes a TLB hit may also be an indication that the previously predicted fault is no longer arising for the address (e.g. following a change in the translation table structure to make a page valid as discussed earlier). A TLB hit does not necessarily mean that the corresponding address can validly be accessed, since if the ISA permits caching of information in the TLB relating to a faulting address for some fault types, such as access permission faults, then sometimes a TLB hit could be detected even if there is a fault detected, such as the access permission fault. Nevertheless, in that case, the translation table walk can already be avoided due to the TLB hit, so a corresponding faulting address filter entry for that address would not help to reduce the number of translation table walks required. Therefore, if a TLB hit is detected for the given target address, the filter entry currently allocated for the given target address could more usefully be used for indicating a faulting address prediction for another address for which there is no TLB hit, and so it can be useful to invalidate or clear the filter entry corresponding to the given target address to make space for another address to be allocated.

Hence, it can be useful to invalidate or clear at least one filter entry of the faulting address filter structure in response to detecting either a translation table walk which does not identify a fault condition or a TLB hit for the given target address. In some cases only the given filter entry, which corresponds to the given target address for which the lack of fault was identified in the translation table walk or TLB lookup, could be cleared or invalidated. In other implementations, more entries could be cleared or invalidated, or even the entire faulting address filter structure could be cleared or invalidated in response to these events.

The faulting address filter structure updating circuitry can also invalidate or clear at least one filter entry of the faulting address filter structure in response to an invalidation event, the invalidation event comprising at least one of: a translation lookaside buffer (TLB) invalidation request to request invalidation of at least one filter entry of a TLB of the memory management circuitry; a context switch; and/or elapse of a predetermined period. When a TLB invalidation request is received or a context switch occurs, it is more likely that changes to the translation table structures used to control access to particular addresses will have occurred so that the chance of previously allocated filter entries of the faulting address filter structure being out of date is greater, and so it may be useful to invalidate at least one filter entry of the faulting address filter structure in response to these events. Different approaches can be taken as to how many entries of the faulting address filter structure are to be cleared or invalidated. Some implementations may take a simpler approach where the entire faulting address filter structure is cleared or invalidated when a TLB invalidation request or context which is detected. Other implementations may select particular filter entries to be cleared or invalidated. For example, if the TLB invalidation request specifies certain invalidation conditions (for example based on a specified address or range of addresses, or based on certain translation context identifiers identifying one or more translation contexts for which TLB entries are to be invalidated), then some implementations may use this information to decide which filter entries need to be invalidated and which can be retained as they are not affected by the TLB invalidation request.

Another event which could trigger invalidation of some or all of the filter entries of the faulting address filter structure can be elapse of the predetermined period. It may be useful to periodically invalidate the entries of the faulting address filter structure because as time goes on it becomes less likely that the previously identified faults would still arise later if the same addresses occur again (when considering the likelihood that context switches may be reasonably likely from time to time). Triggering invalidation on a periodic basis could in some cases be a simpler approach than detecting specific context switches or TLB invalidation requests. For example a counter can be used to count the elapse of the predetermined period, and when the counter reaches a threshold the faulting address filter structure (or part of the faulting address filter structure) can be invalidated or cleared. The period can be counted in different ways, for example in units of time, processing cycles, number of executed instructions, number of processed memory access requests or number of generated prefetch requests. Regardless of how the period is counted, periodically invalidating at least one entry of the faulting address filter structure can help to maintain freshness of the tracking information stored in the faulting address filter structure to reduce the chance that prefetch requests are suppressed unnecessarily based on out-of-date information, and hence can improve performance on average (even if some of the time some useful information is invalidated too early).

The faulting address filter structure can be implemented in a number of different ways. In one example, each filter entry stores a tracking indication comprises an address tag derived from an address for which the translation table walk identified the fault condition. The faulting address prediction circuitry is configured to identify whether the hit condition is satisfied for the prefetch target address based on an address tag comparison of a target address tag derived from the prefetch target address with the address tag stored in at least one looked up filter entry of the faulting address filter structure. For example the faulting address filter structure can have a cache-like or TLB-like structure, where entries can be allocated to a particular address and the address tag distinguishes the address allocated to that entry from other addresses which could have been allocated to that entry. The faulting address filter structure may have an associativity greater than 1. For example, the faulting address filter structure can be a set-associative or fully-associative structure. It is not essential for the address tag to precisely identify the particular address allocated to that entry, as in some cases a hash (with a reduced number of bits) may be used which may permit some false positive aliasing, as this can sometimes provide a better trade-off between performance and circuit area and power costs even if occasionally an incorrect prediction arises due to aliasing between different addresses mapping to the same hash. Other implementations may use approach which does not permit such aliasing. Hence, the prediction of whether a given prefetch target address faults may be performed by looking up one or more filter entries of the faulting address filter structure, comparing the address tags of those entries against an address tag derived from the prefetch target address, and detecting a hit if any of those looked up entries have an address tag corresponding to the address tag derived from the prefetch target address.

In some examples, each filter entry also specifies at least one translation context identifier, and the faulting address prediction circuitry identifies whether the hit condition is satisfied for the prefetch target address based on the address tag comparison and a context comparison of the at least one translation context identifier stored in at least one looked up filter entry with at least one translation context identifier associated with the prefetch request specifying the prefetch target address. Since different translation contexts will be associated with different sets of translation tables, a given address which causes a fault in one translation context may not cause a fault in another transition context. By associating filter entries with a translation context identifier used to control whether a hit is detected, this can improve the accuracy of the prediction because prefetch requests generated for one translation context no longer hits against an entry allocated in response to a fault rising for the same address in a different translation context.

In some examples, each filter entry also specifies an address block size indication indicative of an address block size for a corresponding block of addresses, and the faulting address prediction circuitry is configured to adapt which bits are compared in the address tag comparison for a given looked up filter entry based on the address block size indication of the given looked up filter entry (for larger address block sizes, one or more bits can be excluded from the address tag comparison which would be compared for smaller address block sizes). Supporting variable block size can be useful to make more efficient use of a limited number of filter entries because it means that if there is a larger block of addresses which all would encounter a fault then this can be represented by a single filter entry conserving other filter entries for other blocks of addresses, whereas if each filter entry only corresponded to a single fixed block size then if a number of neighbouring blocks of that block size are to be tracked as all being predicted to encounter the fault, those blocks of addresses would have to be represented by separate filter entries.

The address block size indication can be represented in different ways. In one example, the address block size indication comprises a translation granule size indication indicative of a translation granule size associated with a translation table entry for which the translation table walk identified the fault condition. This may exploit the fact that translation table entries within some translation table structures may support different granule sizes and so on allocating a new filter entry to the faulting address filter structure the address block size indication may be set based on the granule size associated with the translation table entry which cause the fault to be identified.

In another example, the address block size indication comprises a translation table level indication indicative of a level of a hierarchical translation table structure at which the translation table walk identified a translation table entry which caused the fault condition to be identified. Some formats of translation table structure may permit a translation table walk to be terminated early by providing a block descriptor entry at a level of the translation table structure other than the final level (instead of providing a table descriptor entry pointing to a subsequent level of translation table), so that the block descriptor entry allows memory access control parameters to be defined for a larger block of memory than is possible for entries at the final level of translation table. Similarly, if an invalid entry is identified on reaching a given level of the translation table structure other than the final level, the corresponding translation fault will arise for any address within a larger block of addresses than the block of addresses which corresponds to one entry in the final level of translation table. Hence, the level of the hierarchical translation table structure at which a fault is identified may be an indication of the size of the block of addresses for which faults are predicted to arise, and so recording the level in the filter entry can enable selection of the appropriate bits of the address tags to compare to account for the corresponding sized block of addresses represented by that filter entry.

The address tag may track addresses at a granularity corresponding to, or coarser than, a translation granule size with which address mappings are defined in a translation table structure accessed in the translation table walk. Some examples may define the address tag at the same granularity as the translation granule size with which address mappings are defined in the translation table structure (as noted above, if a variable translation granule size is supported by the translation table structure then the filter entries may also support indications of such variable block sizes for tracking addresses predicted to fault).

However, it is not essential for the address tag stored in an entry of the faulting address filter structure to use the same granularity of the corresponding translation table entry which caused a fault to be detected by the memory management circuitry. Some implementations may define the address tag at a coarser granularity than the granularity used by the translation table structures. For example, a number of memory regions which would map to different translation table entries in the translation table structure may map to the same filter entry in the faulting address filter structure. This can help to reduce the circuit area implementation cost of the faulting address filter structure. As it may be reasonably likely that a number of adjacent memory regions may have the same properties for whether a fault is predicted or not, this can be a reasonable approach for trading off performance and circuit area implementation cost. Some implementations may only indicate in the faulting address filter structure that a given address block is predicted to cause faults if all of the memory regions within that address block correspond to translation table entries which would cause a fault to be detected. Other implementations may indicate in the faulting address filter structure that a given address block is predicted to cause a fault if any one of the memory regions within that address block corresponds to a translation table entry which would cause a fault to be detected.

Another way of implementing the faulting address filter structure can be to provide a direct-mapped structure for which any given address maps to a single filter entry of the faulting address filter structure. The tracking indication may comprise a prefetch suppression indication settable to one of a suppression state and a non-suppression state. The faulting address prediction circuitry may determine that the hit condition is satisfied for the prefetch target address when the filter entry of the direct-mapped structure corresponding to the prefetch target address specifies the prefetch suppression indication in the suppression state. This implementation can require less storage per entry than the alternative option using the address tags as discussed above, because each entry may be as small as a single bit indicating either the suppression state or the non-suppression state. Prefetch suppression indication setting circuitry can set, in response to the memory management circuitry identifying the fault condition for a faulting address, the prefetch suppression indication of a selected filter entry corresponding to the faulting address to the suppression state. The prefetch suppression indication setting circuitry can set the prefetch suppression indication of at least one filter entry to the non-suppression state in response to at least one of: the fault condition not being detected during a translation table walk for a given address corresponding to one of said at least one filter entry, or a hit being detected for the given address in a translation lookaside buffer (TLB) of the memory management circuitry; a TLB invalidation request to request invalidation of at least one filter entry of the TLB; a context switch; and/or elapse of a predetermined period.

The prefetch circuitry may comprise at least one of: data prefetching circuitry, where the information comprises data; and/or instruction prefetching circuitry, where the information comprises at least one instruction. Hence, the faulting address prediction can be used for either data prefetching, or instruction prefetching, or both. In implementations which support faulting address prediction for both the data prefetching circuitry and instruction prefetching circuitry, the data prefetching circuitry and instruction prefetching circuitry could share the same faulting address prediction circuitry and same faulting address filter structure, or alternatively separate faulting address filter structures (and corresponding faulting address prediction circuitry) may be provided for the data prefetching circuitry and instruction prefetching circuitry respectively.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14. In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 26 for performing load/store operations to access data in a memory system 8, 30, 32, 34. A memory management unit (MMU) 28 is provided for performing address translations between virtual addresses specified by the load/store unit 26 based on operands of data access instructions and physical addresses identifying storage locations of data in the memory system. The MMU has a translation lookaside buffer (TLB) 29 for caching address translation data from page tables stored in the memory system, where the page table entries of the page tables define the address translation mappings and may also specify access permissions which govern whether a given process executing on the pipeline is allowed to read, write or execute instructions from a given memory region.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline implementation, and the processor may include many other elements not illustrated for conciseness.

The apparatus 2 also has prefetch circuitry for generating prefetch requests to request prefetching of information associated with a prefetch target address to a cache. In this example, the prefetch circuitry includes data prefetch circuitry 40 for prefetching data into a data cache (e.g. the level 1 data cache 30, although other examples could prefetch into the level 2 cache 32 or a subsequent cache), and instruction prefetch circuitry 42 for prefetching instructions into an instruction cache (e.g. the level 1 instruction cache 8, although other examples could prefetch instructions into the level 2 cache 32 or a subsequent cache). While this example shows both data and instruction prefetch circuitry 40, 42, other examples could only have one of these types of prefetch circuitry. While the MMU 28 is shown as a single entity shared for both data and instructions, other examples may provide a separate instruction-MMU and data-MMU which handle the MMU functions for instruction/data memory access requests respectively.

Figure 2:
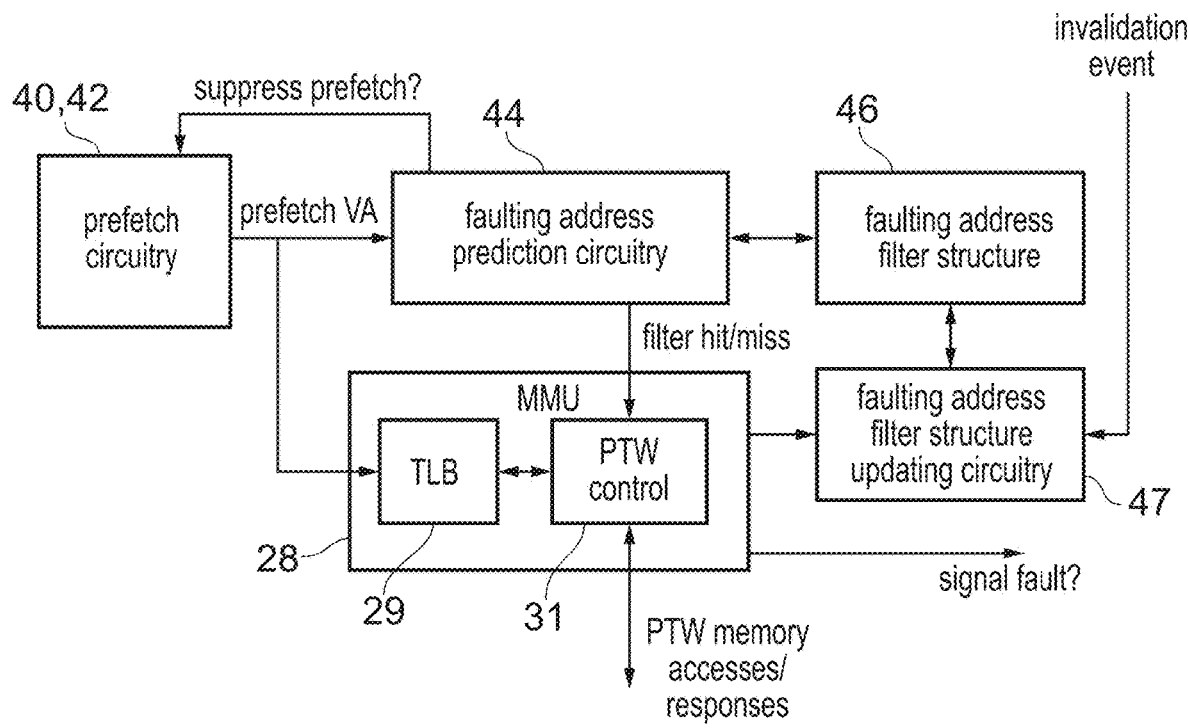
FIG. 2 illustrates prefetch circuitry, memory management circuitry and faulting address prediction circuitry.

FIG. 2 illustrates a portion of the apparatus 2 shown in FIG. 1. The MMU 28 includes the TLB 29 and page table walk (PTW) control circuitry 31 to control page table walks (also known as translation table walks) for obtaining, from the memory system, page table entries which provide page table information (e.g. address translation mappings, access permissions, memory attributes and other information) associated with regions of memory address space. When a memory access request (e.g. an instruction fetch request issued by the fetch stage 6 or a data access request issued by load/store unit 26) is issued by the pipeline 4 requesting an access to a location associated with a target address, the address is looked up in the TLB 29 and if there is a hit then the page table information for the specified address is read from the TLB 29 and used by the MMU 28 to control translation of the virtual address specified by the memory access request into a physical address identifying storage locations within the memory system, and to control whether the access is permitted at all (based on the specified access permissions). The memory attributes associated with the target address of the memory access request may also influence how the memory access are processed, for example controlling whether caching of information read from the address location is allowed.

If the target address misses in the TLB 29, the PTW control circuitry 31 initiates a page table walk for obtaining the required page table information from memory. The page table walk process may include memory accesses which obtain various page table entries from multiple stages and/or levels of page tables. To support virtualisation, the MMU 28 may implement two-stage address translation where the translation from the virtual address to a physical address is performed based on a stage 1 mapping from the virtual address to an intermediate address under control of a first set of page tables maintained by an operating system, and a stage 2 mapping from the intermediate address to the physical address under control of a second set of page tables maintained by a hypervisor. For both the first stage page tables and the second stage page tables, a hierarchical page table structure may be used having multiple levels of page table, where a higher level page table entry provides a pointer to a base address of the page table at a lower level of the hierarchical structure, so that a traversal of multiple levels of page table eventually locates a page table entry which provides the address mapping for the corresponding address. Different portions of the input address for the stage 1 or stage 2 translation (the input address is the virtual address for stage 1 and the intermediate address for stage 2) are used to index into the page tables at each level. When two stages of address translation are used, the page table walk can include a relatively large number of memory accesses since each page table pointer obtained in the stage-1 page table walk may itself need to be translated into physical address using the stage 2 page tables, as well as translating the target virtual address of the memory location to be accessed by the initial data access or instruction fetch which caused the page table walk to be performed. For example, with 4 levels of stage-1 page tables and 4 levels of stage-2 page tables, up to 24 memory accesses may be performed in a full page table walk: 4 accesses to obtain each of the relevant stage-1 entries at the 4 levels of the stage-1 page table structure, and 5 sets of 4 accesses to the relevant stage-2 entries needed for each stage-2 translation to obtain the physical addresses of the 4 stage-1 page table entries being accessed and the physical address corresponding to the target virtual address representing the actual data/instruction being accessed in the memory access request that originally triggered the page table walk. Hence, page table walks can be extremely slow and costly in terms of performance.

To improve performance, when a page table walk is performed, the page table information obtained in the page table walk can be cached in the TLB 29 for faster access so that if there is a subsequent memory access to an address in the same page as a previously accessed page then the subsequent memory access can hit in the TLB 29 and avoid needing to perform the page table walk. As well as caching the end result of the page table walks it is also possible for the TLB to cache some of the information from intermediate page table entries accessed during the page table walk process which can also help eliminate some steps in the page table walk when accessing other pages not previously accessed but which share one of the higher-level page table entries with a previously accessed page.

The MMU 28 also checks for various types of address fault condition which may arise when attempting to access memory. If any of these address fault conditions occurs, the MMU 28 prevents the memory access being processed and signals a fault condition. Exception handling circuitry within the processor 2 can detect these fault conditions and respond by interrupting the processing being carried out by the pipeline 4 and switching to execution of an exception handler for dealing with the cause of the fault. Examples of address fault conditions that can be signalled by the MMU 28 can include:

a translation fault, when the MMU 28 performs a page table walk for a particular address, and finds that no valid page table entry corresponding to that address has been defined at a particular stage/level of the page table structures.

an access permission fault, when the MMU 28 detects based on the access permission specified in a page table entry for the target address of a memory access that the memory access is not a type of memory access allowed to access the location associated with the target address. For example, the access permissions may specify whether the location associated with the target address is allowed to be accessed in response to read (load) access requests, write (store) access requests and/or instruction fetch access requests respectively. The access permissions could also restrict access to certain privilege levels or operating states of the processing pipeline 4.

an address range fault, when the MMU 28 detects that the target address of the memory access is outside an allowable range of addresses. The allowable range of addresses could be fixed, or could be variable based on control parameters specified in control registers of the MMU 28 or the processor 2. For example, it can be useful to reserve a certain portion of address values for special purposes so that they cannot be used for regular memory accesses. In this case, a memory access specifying one of the reserved addresses may trigger a fault and then this may prompt an exception handler to carry out an action corresponding to the address that was specified.

an access indicator fault, when the MMU 28 detects that a valid translation table entry corresponding to the target address specifies an access indicator in a predetermined state indicating that no previous accesses have been made to a corresponding page of addresses since the access indicator was set to the predetermined state. This may prompt an exception handler to execute which may then update the access indicator to indicate that at least one access has been made to the corresponding page of addresses. Such access indicators can be useful for software tracking of frequency of access to particular pages of the address space, which can be useful for controlling operations such as paging out data to external storage.

The instruction set architecture (ISA) supported by the processing circuitry 4 may prescribe that, for at least some of these types of address fault (e.g. the translation fault, address range fault, or access indicator fault), the MMU 28 is not allowed to cache information in the TLB 29 that is based on a page table entry which causes one of these types of address fault to occur. This is useful because it ensures that if an update to page table information or control parameters causes a particular address to change from a faulting address for which one of these types of address fault would arise to a non-faulting address for which none of these types of address fault arises (e.g. because a page of address space has been made valid, because a boundary of the allowable range of addresses for detecting address range faults has changed, or because the access indicator for a page has been updated to the state indicating that at least one access has been made to that page), then there is no need to invalidate previously cached information from the TLB 29 which might indicates that the fault should arise for accesses to that address. This is useful because it can be relatively frequent that the access indicators are updated and new valid pages of address space are allocated after previously being invalid, so invalidating the TLB each time one of these events occurred would greatly harm performance as it would make it much more likely that full page table walks would be needed more often. The access permission fault may be a type of fault for which the ISA may not prohibit caching of information indicating whether the fault would arise, because the access permissions may indicate that some types of accesses are allowed to access the page while other types are not, so it is beneficial to performance to allow the access permissions to be cached so that those types of requests which are allowed to access the page can be processed without needing a page table walk.

Hence, for types of address fault for which the ISA restricts caching of information from faulting page table entries, often it may not be possible for the MMU 28 to identify that a memory access to a particular address will cause an address fault based on information cached in the TLB 29 alone. While memory accesses to non-faulting addresses can in the majority of cases be handled quickly based on a hit in the TLB 29, memory accesses to a faulting address will generally cause the page table walk to be performed and so it may be some time before the fault can be identified. For demand memory accesses based on instruction fetch requests and data access requests made by the processing pipeline 4 based on the actual needs of the software being executed, this is not a problem because if a fault arises then this will cause an exception handler to interrupt the activity of the software being executed, and the taking and handling of the exception is itself a relatively slow event which is disruptive to performance, so the fact that it takes longer to identify that the fault has arisen is insignificant when considering the overall effect on performance of the access to the faulting address. Accesses to faulting addresses may be relatively rare compared to accesses to non-faulting addresses and so the ISA prohibition on caching information indicating that an access to a particular address would cause one of these types of address fault would not be expected to affect performance significantly.

However, when the prefetch circuitry 40, 42 generates prefetch requests requesting prefetching of information (data or instructions) associated with the prefetch target address, then if the prefetch target address is a faulting address this can have an impact on processing performance for the software being executed on the processing pipeline 4. Address faults for the prefetch requests can be relatively common because often regions of invalid address space may be left unallocated after the end of a structure being processed, to deal with the possibility that buffers could overrun for example, and so if a prefetcher detects a stride pattern of memory addresses being accessed, often the prefetcher may not be able to detect when the end of the structure is reached and may continue issuing prefetch request for subsequent addresses in the invalid region after the end of the data structure.

When a prefetch request is issued by the prefetch circuitry 40, 42, the prefetch target address of the prefetch request is looked up in the TLB 29 by the MMU 28 and if there is a hit then the address can be translated based on the cached information from the TLB 29 and any access permission checks can be based on cached information. However, when the prefetch target address misses in the TLB 29 then the page table walk is triggered by the PTV/control circuitry 31, to locate the page table information for the page comprising the prefetch target address. If no fault is identified and the prediction that the prefetch target address will be accessed in future is correct, triggering the page table walk in response to the prefetch request is beneficial for performance because it means that the page table walk has been initiated early before the actual point of program flow at which the demand memory access for that address is issued. However, if the page table walk triggered in response the prefetch request is determined by the MMU 28 to cause an address fault to be identified, then the prefetch request has served no useful purpose, and so the (relatively large number of) memory accesses issued as part of the page table walk have wasted memory bandwidth which could instead have been used to handle other requests. This may have a performance impact on the program code executing on the processing pipeline 4 because other requests issued by the program code may be delayed as a result of the unnecessary page table walk memory accesses being performed.

As shown in FIG. 2, to address this problem faulting address prediction circuitry 44 is provided to provide a prediction of whether a page table walk performed for a prefetch target address of a prefetch request issued by the prefetch circuitry 40, 42 will cause the MMU 28 to identify an address fault (at least for one of the types of address fault for which the ISA prohibits caching of information in the TLB 29). For example, the prediction can be made by looking up the prefetch target address in a faulting address filter structure 46 which maintains tracking information tracking addresses for which an address fault was previously identified to occur. Faulting address filter structure updating circuitry 47 updates the information in the faulting address filter structure 46 in response to the detection of address faults by the MMU 28 and other events which may indicate that previously allocated tracking information in the faulting address filter structure 46 should be invalidated. Hence, when a prefetch target address is looked up in the faulting address filter structure 46, when a hit condition is detected, this may indicate that the prefetch target address is predicted to cause an address fault, and this may be determined without needing to actually perform a page table walk for that address. When the prefetch target address is predicted to cause an address fault, the faulting address prediction circuitry 44 signals to the MMU 28 that the page table walk for the prefetch target address can be suppressed to avoid waste of resource and memory bandwidth. Also, the faulting address prediction circuitry 44 signals to the prefetch circuitry 40, 42 that the prefetch request itself can be suppressed, and this can save resource within both the prefetch circuitry 40, 42 and the MMU 28 in not needing to process the prefetch request.

Figure 3:
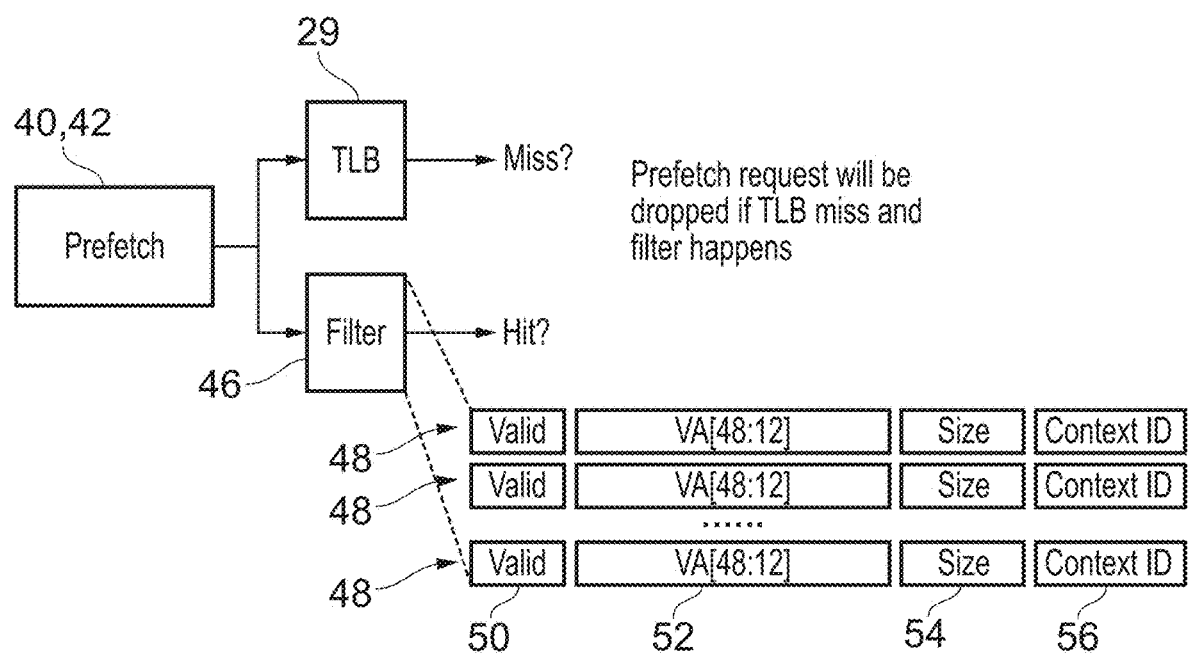

FIG. 3 illustrates a first example structure for the faulting address filter structure 46. Structure 46 includes a number of filter entries 48 which each specify a valid indication 50, an address tag 52, and optionally an address block size 54 and/or context identifier 56. In this example the filter 46 has a fully-associative structure, but a set-associated structure could also be used. When an address fault (of one of the types for which the ISA prohibits caching of information related to the fault in the TLB 29) is identified, an address tag is derived from the faulting address (in this example, the tag is simply bits [48:12] of the virtual address that caused the fault, but other examples could select a different subset of bits, and/or generate the address tag 52 as a hash of bits of the faulting address) and allocated to a filter entry 48 which is made valid as indicated by the valid indication 50. In some examples, the granularity of tracking the address tags 52 may be coarser than the granularity with which page table entries are defined in the page table structure, so that a single filter entry 48 is shared between a block of entries of greater size than one page—this can reduce the area cost of the filter structure 46 and exploit the address locality which makes it more likely that a group of neighbouring pages may all encounter a fault.

When a prefetch request is generated by the prefetch circuitry 40, 42, the prefetch target address is looked up in the filter 46 by comparing an address tag value derived from the prefetch target address with the address tags in any valid entries 48 of the filter (or, if a set-associative structure is used, only entries 48 in a particular set of entries indexed corresponding to the prefetch target address are looked up to compare the address tag). If the address tag value derived from the prefetch target address matches the address tag in any valid looked up entry 48, a hit condition is identified in the faulting address filter structure 46, which indicates a prediction that the MMU 28 would identify an address fault if the prefetch request was processed and the page table walk was performed.

If the size indication 54 is supported, then when looking up the faulting address filter structure 46, the faulting address prediction circuitry 44 adapts which bits of the address tag of a given filter entry 48 are compared based on the size indication 54 of the given filter entry 48, so that when the size indication indicates a larger block size, fewer bits of the address tag are compared so that a larger block of addresses will be considered to hit against the given filter entry. The size indication 54 could be set based on a granule size indication indicated in a page table entry corresponding to the address, in an implementation where page table entries support variable granule size, or could be set based on the level of the hierarchical page table structure at which the fault was identified (since if an invalid page table entry is identified at a higher level of the page table structure, this will affect a larger block of addresses than if an invalid page table entry is identified at a lower level for example).

If the context identifier 56 is supported, then on allocating a new entry to the faulting address filter structure 46, the context identifier 56 of the new entry is set based on a current translation context used by the MMU 28 for address translation. The context identifier 56 could in some instances be based on a combination of multiple context identifiers (e.g. an address space identifier allocated by an operating system to distinguish a number of different stage-1 translation table structures corresponding to different applications managed by the operating system, and a virtual machine identifier allocated by a hypervisor to distinguish a number of different stage-2 translation table structures corresponding to different guest operating systems). In general, each context identifier value may correspond to a different set of translation table structures used to control memory access. TLB lookups in the TLB 29 may also be qualified based on such context identifiers. Hence, when the context identifier 56 is supported, the lookup of the faulting address filter structure 46 also depends on the context identifier, so that a hit in a given filter entry 48 can be detected if both the address tag comparison detects a match between the address tag corresponding to the prefetch target address and the address tag 52 stored in the given filter entry 48, and a context identifier comparison detects the match between a current translation context and the context indicated by the context identifier 56 of the given filter entry 48. If either the address tag comparison or the context identifier comparison detects a mismatch then a miss is detected for the given filter entry 48.

If the prefetch target address misses in all entries of the filter structure 46, then the prefetch target address is not predicted to cause a fault and so the prefetch request continues to be processed, including triggering a page table walk if the prefetch target address also misses in the TLB 29.

If the prefetch target address hits in the filter structure 46, but also hits in the TLB 29, then in this example the prefetch request is again still processed and is not suppressed. No page table walk is necessary because of the hit in the TLB 29, and so the cached information in the TLB 29 can be used to translate the prefetch target address and cause a request to be sent to bring the information associated with the prefetch target address into a cache 30, 32, 8.

If the prefetch target address hits in the filter structure 46, but misses in the TLB 29, then the prefetch request is dropped (suppressed) and the page table walk which would ordinarily be performed on a TLB miss is also suppressed, to avoid the waste of memory bandwidth which is predicted to arise in performing at page table walk for an address which ultimately triggers a fault to be signalled. This helps to improve performance by conserving memory bandwidth the other demand accesses or prefetch accesses which are expected to serve a more useful purpose.

The entries 48 of the faulting address filter structure 46 may be managed in a similar way to entries of a cache or TLB, with a replacement policy being used to control replacement of entries if there are no invalid entries remaining when a new entry needs to be allocated on detection of a fault for an address not previously having a valid entry allocated.

Figure 4:
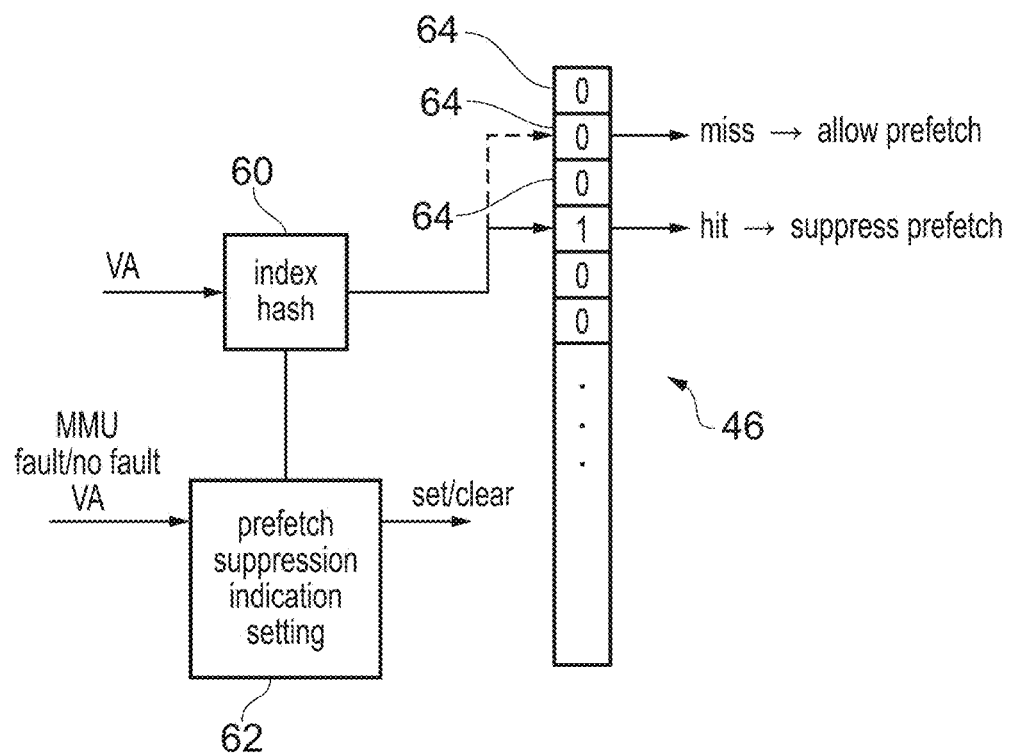
FIGS. 3 and 4 illustrate two examples of use of a faulting address filter structure for making a faulting address prediction for a prefetch target address.

FIG. 4 shows an alternative structure for the faulting address filter structure 46. In this case, rather than storing address tags, the filter structure 46 includes a direct-mapped set of filter entries which provide tracking indications 64 which can each be set to one of a suppression state (in this example, indicated by a bit value of 1) and a non-suppression state (in this example, indicated by a bit value of 0). Index hash generating circuitry 60 can generate an index value corresponding to a particular target address of a prefetch request or a memory access request processed by the MMU 28, where the index value identifies which of the tracking indications 64 corresponds to that address. Prefetch suppression indicating setting circuitry 62 sets, to the suppression state, the tracking indication 64 corresponding to an address identified by the MMU 28 as causing an address fault (of one of the types for which the ISA prohibits caching of information in the TLB 29), and sets the tracking indication 64 corresponding to that address to the non-suppression state when no fault is detected for that address. When a prefetch request is issued, the prefetch target address is looked up in the filter structure 46 by reading the tracking indication 64 indexed based on that address, and detecting a hit if the read tracking indication is in the suppression state and a miss if the read tracking indication is in the non-suppression state. On a hit, a prediction is made that the prefetch target address would trigger a fault and so the prefetch request can be suppressed and any page table walk can be suppressed too (again, as shown in FIG. 3, in some implementations whether the prefetch request is suppressed may also depend on whether the address hits in the TLB 29).

For both the example structures shown in FIGS. 3 and 4, from time to time entries of the faulting address filter structure 46 can be invalidated (in the case of FIG. 3) or cleared to the non-suppression state (in the case of FIG. 4) in response to various events which may indicate that it is likely that some of the tracking information in the filter structure 46 may be out-of-date. For example, such invalidation events may include: a context switch, detection of a TLB invalidation request being issued to trigger invalidation of TLB entries from the TLB 29, detection that a TLB hit occurred for a particular address for which the filter structure 46 recorded a prediction that the address would fault, detection that a page table walk was performed for a particular address predicted as faulting and the page table walk did not cause a fault to be detected, and/or elapse of a predetermined period (e.g. a counter which counts elapse of the period reaching a certain threshold indicating the end of the period—the period could be counted in different units including processing cycles, processed instructions, processed memory access requests, processed prefetch requests, etc.).

Figure 5:
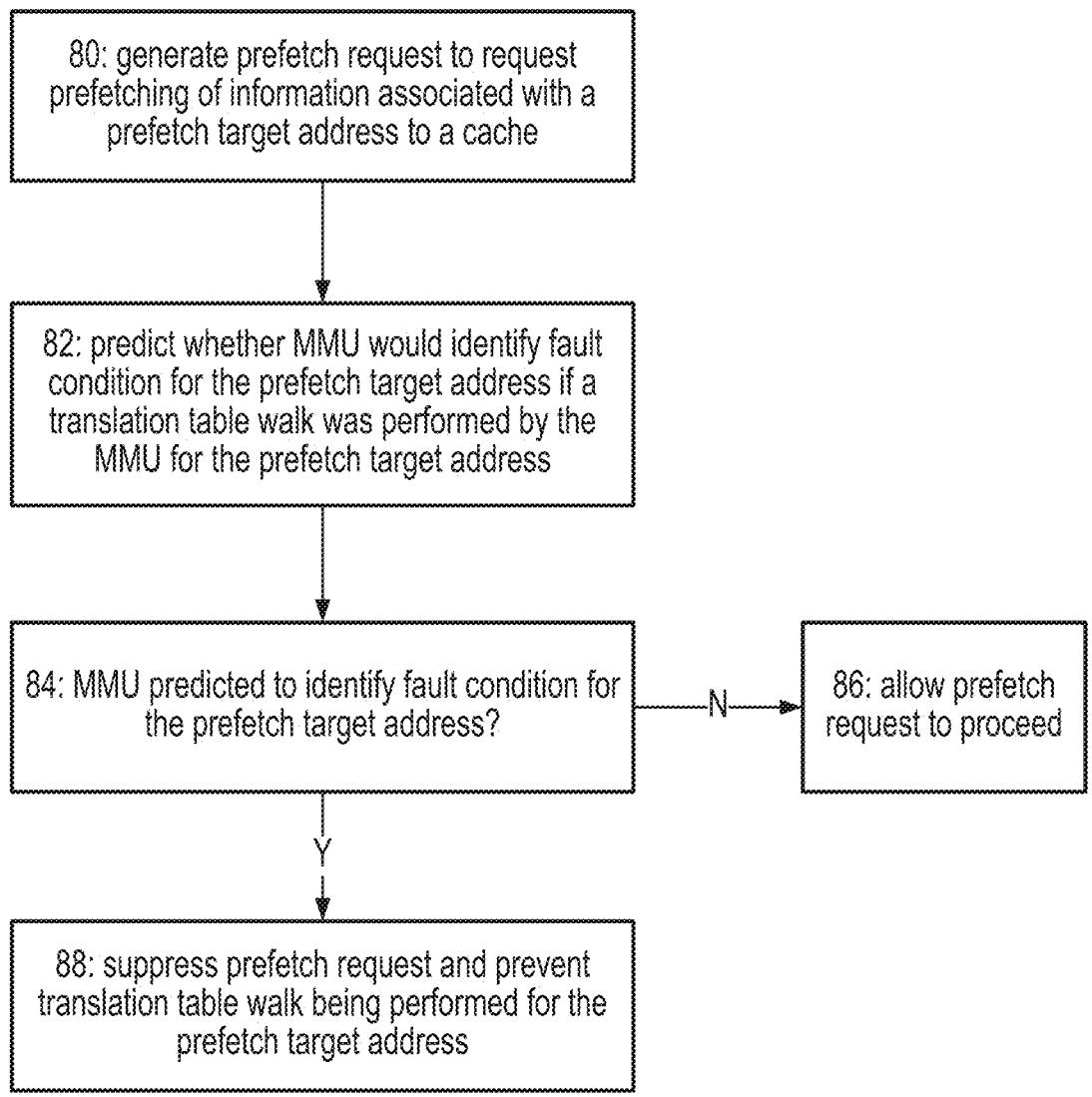
FIG. 5 is a flow diagram illustrating a method of processing prefetch requests.

FIG. 5 is a flow diagram illustrating a method of handling prefetch requests. At step 80 the prefetch circuitry 40, 42 generates a prefetch request to request prefetching of information associated with a prefetch target address into a cache 8, 30, 32. At step 82 the faulting address prediction circuitry 44 predicts whether the MMU 28 would identify a fault condition for the prefetch target address if a translation table walk is performed by the MMU for the prefetch target address. At step 84 it is determined whether the faulting address prediction circuitry 44 has predicted that a fault condition would be identified for the prefetch target address. If the prefetch target address is not predicted to cause a fault condition then at step 86 the prefetch request is allowed to proceed. If the prefetch target address is predicted to cause a fault condition then at step 88 the prefetch request is suppressed and the MMU 28 is prevented from performing the translation table walk for the prefetch target address.

Figure 6:
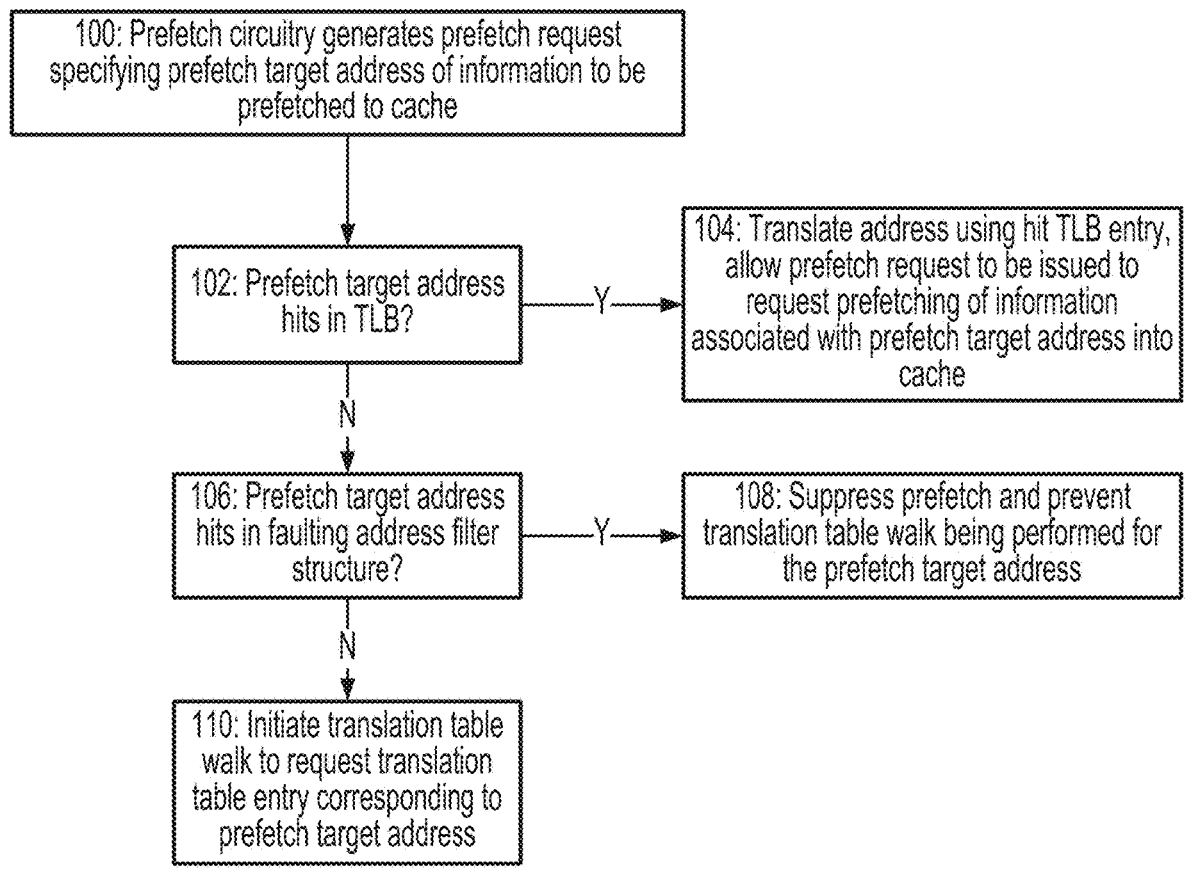
FIG. 6 is a flow diagram illustrating in more detail a specific example of controlling handling of the prefetch request based on a faulting address prediction.

FIG. 6 is a flow diagram illustrating in more detail a particular example of a method for handling prefetch requests. At step 100 the prefetch circuitry 40, 42 generates a prefetch request to request prefetching of information associated with a prefetch target address into a cache 8, 30, 32. At step 102 the prefetch target address is looked up in the TLB 29 of the MMU 28, and the MMU 28 detects whether a hit is detected in the TLB 29. If a TLB hit is detected then at step 104 the prefetch target address is translated using the hit TLB entry, and the prefetch request is allowed to be issued to request prefetching of information associated with the prefetch target address into the cache 8, 30, 32.

If a TLB miss was detected at step 102, then at step 106 the faulting address prediction circuitry 44 looks up the prefetch target address in the faulting address filter structure 46, and if there is a hit then at step 108 the prefetch request is suppressed and the translation table walk is prevented from being performed for the prefetch target address. If a miss was detected in the faulting address filter structure at step 106, then at step 110 a translation table walk is initiated by the PTV/control circuitry 31 to request that the translation table entry corresponding to the prefetch target address is obtained from memory.

While FIG. 6 shows step 106 performed sequentially after a TLB miss is detected in step 102, other examples could look up the TLB 29 and the faulting address filter structure 46 in parallel.

Figure 7:
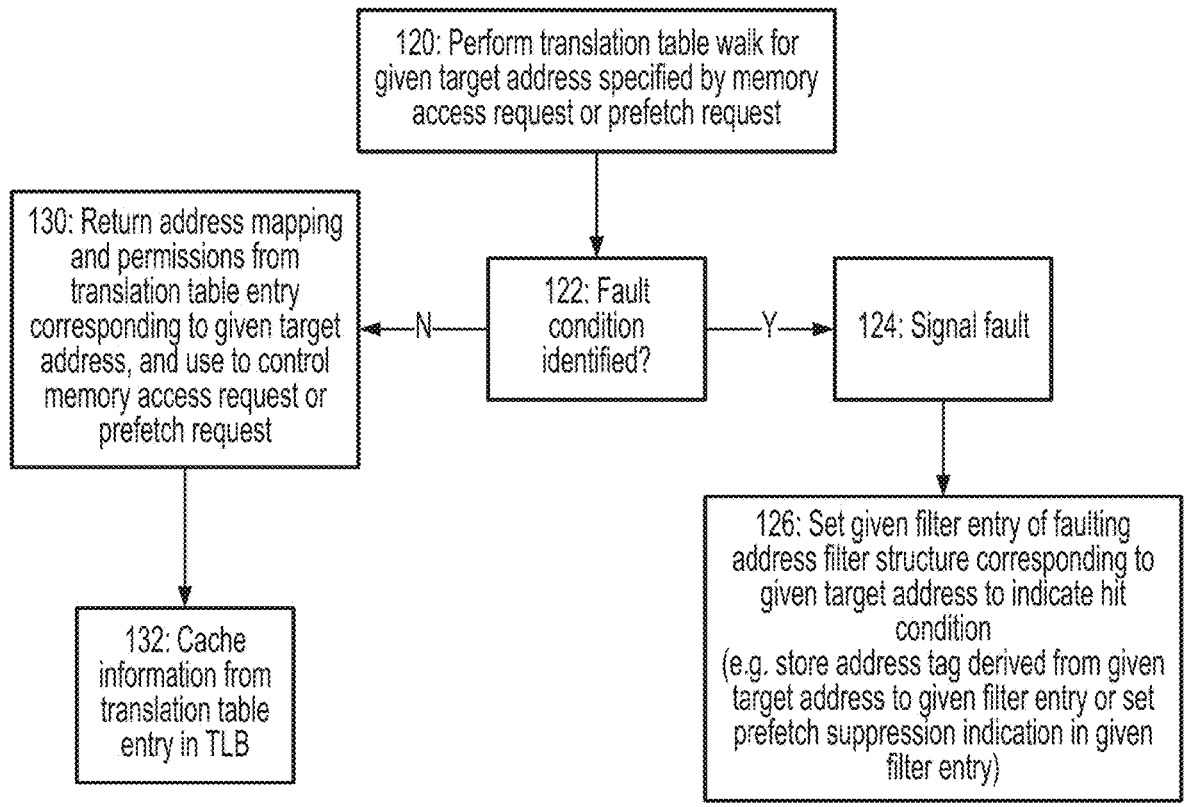
FIG. 7 is a flow diagram illustrating updating a faulting address filter structure following a translation table walk which identifies a fault condition.

FIG. 7 is a flow diagram illustrating steps performed when a translation table walk is performed, either in response to a memory access request issued on demand by the processing pipeline 4 or in response to a prefetch request issued by the prefetch circuitry 40, 42. At step 120 the translation table walk is performed for a given target address. At step 122 the MMU 28 identifies whether a fault condition has been detected, and if so then at step 124 fault is signalled. At step 126 a given filter entry of the faulting address filter structure 46 corresponding to the given target address is set by the faulting address filter structure updating circuitry 47 to indicate that the hit condition would be identified if the given target address is subsequently looked up in the faulting address filter structure 46. For example, the address tag 52 derived from the given target address may be allocated to a new valid entry 48 of the filter structure shown in FIG. 3, or the tracking indication 64 corresponding to the given target address may be set to the suppression state in the example of FIG. 4.

If at step 122 no fault condition is identified, then at step 130 the information (e.g. address mapping and access permissions) is returned from the translation table entry corresponding to the given target address, and used to control the processing of the memory access request or the prefetch request. The returned information is cached in the TLB 29 at step 132.

Figure 8:
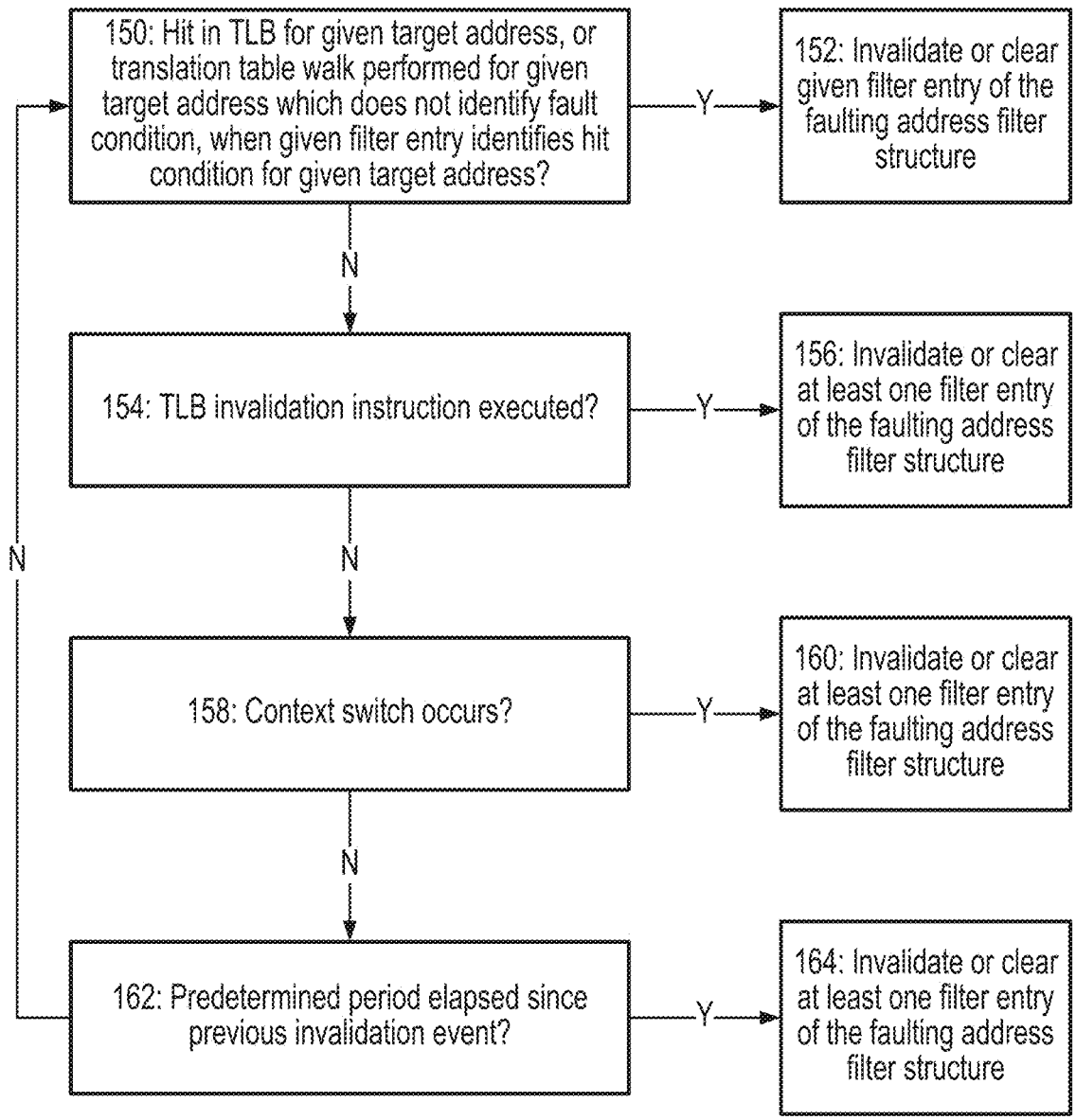
FIG. 8 is a flow diagram illustrating invalidating or clearing one or more entries of the faulting address filter structure.

FIG. 8 is a flow diagram illustrating a method for controlling invalidation of entries of the faulting address filter structure 46. At step 150, the faulting address filter structure updating circuitry 47 detects whether the MMU 28 has detected a hit in the TLB for a given target address or has performed the translation table walk for the given target address and determined that the walk did not cause the fault condition to be detected, when a given filter entry corresponding to the given target address identifies that the hit condition would arise for the given target address. If so, then at step 152 the faulting address filter structure updating circuitry 47 invalidates or clears the given filter entry of the faulting address filter structure 46.

If at step 154 the faulting address filter structure updating circuitry 47 detects that a TLB invalidation instruction is being executed, then at step 156 the faulting address filter structure updating circuitry 47 invalidates or clears at least one filter entry of the faulting address filter structure (the invalidated/cleared entry may include at least the entries which satisfy the invalidation criteria specified by the TLB invalidation instruction, or could include all the entries of the filter structure 46).

If at step 158 the faulting address filter structure updating circuitry 47 detects that a context switch occurs, then at step 160 the faulting address filter structure updating circuitry 47 invalidates or clears at least one filter entry of the faulting address filter structure (in some cases all entries of the filter structure 46 can be invalidated at this time).

If at step 162 the faulting address filter structure updating circuitry 47 detects that a predetermined period has elapsed since a previous invalidation event, then at step 164 the faulting address filter structure updating circuitry 47 invalidates or clears at least one filter entry of the faulting address filter structure (again, it is possible that all filter entries could be invalidated or cleared at this time).

While the flow diagram FIG. 8 shows the various types of invalidation event being checked sequentially, it is also possible to check these in parallel or in a different order. It will be appreciated that not all of the types of invalidation event in FIG. 8 need to be implemented in a particular system. For example, if the filter structure 46 which supports the context identifier 56 as shown in FIG. 3 is used, it may not be necessary to invalidate entries on a context switch because the context identifier 56 can be used to distinguish the new context from entries allocated for the old context.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
    memory management circuitry to perform a translation table walk for a target address of a memory access request and to signal a fault in response to the translation table walk identifying a fault condition for the target address;
    prefetch circuitry to generate a prefetch request to request prefetching of information associated with a prefetch target address to a cache;
    faulting address prediction circuitry to predict whether the memory management circuitry would identify the fault condition for the prefetch target address if the translation table walk was performed by the memory management circuitry for the prefetch target address; in which:
    in response to the faulting address prediction circuitry predicting that the memory management circuitry would identify the fault condition for the prefetch target address if the translation table walk was performed for the prefetch target address, the prefetch circuitry is configured to suppress the prefetch request and the memory management circuitry is configured to prevent the translation table walk being performed for the prefetch target address of the prefetch request;
    a faulting address filter structure comprising a plurality of filter entries, each filter entry storing a tracking indication for a corresponding subset of addresses; in which:

the faulting address prediction circuitry is configured to predict whether the memory management circuitry would identify the fault condition for the prefetch target address, based on whether a lookup of the faulting address filter structure for the prefetch target address identifies a hit condition for the prefetch target address; and faulting address filter structure updating circuitry to invalidate or clear at least a given filter entry of the faulting address filter structure corresponding to a given target address in response to at least one of:
the memory management circuitry performing the translation table walk for the given target address when the fault condition is not identified; and
the memory management circuitry detecting a hit in a translation lookaside buffer (TLB) for the given target address.

2. The apparatus according to claim 1, in which the fault condition for the target address is one of:
a translation fault indicative of a translation table entry corresponding to the target address being invalid;
an address range fault indicative of the target address being outside an allowable range of addresses; and
an access indicator fault indicative of a valid translation table entry corresponding to the target address specifying an access indicator in a predetermined state indicating that no previous accesses have been made to a corresponding page of addresses since the access indicator was set to the predetermined state.

3. The apparatus according to claim 1, comprising processing circuitry to process instructions according to an instruction set architecture specifying that the memory management circuitry is prohibited from caching, in a translation lookaside buffer, a translation table entry that causes the fault condition to be identified in the translation table walk.

4. The apparatus according to 1, in which the prefetch circuitry is configured to suppress the prefetch request in response to determining that the lookup of the faulting address filter structure identifies the hit condition and a translation lookaside buffer (TLB) lookup performed by the memory management circuitry for the prefetch target address misses in a TLB of the memory management circuitry.

5. The apparatus according to claim 1, comprising faulting address filter structure updating circuitry to set, in response to the memory management circuitry identifying the fault condition for a given target address, a given filter entry corresponding to the given target address to indicate that the hit condition would be satisfied for the given target address.

6. The apparatus according to claim 1, in which the tracking indication comprises an address tag derived from an address for which the translation table walk identified the fault condition; and
the faulting address prediction circuitry is configured to identify whether the hit condition is satisfied for the prefetch target address based on an address tag comparison of a target address tag derived from the prefetch target address with the address tag stored in at least one looked up filter entry of the faulting address filter structure.

7. The apparatus according to claim 6, in which each filter entry also specifies at least one translation context identifier, and the faulting address prediction circuitry is configured to identify whether the hit condition is satisfied for the prefetch target address based on the address tag comparison and a context comparison of the at least one translation context identifier stored in at least one looked up filter entry with at least one translation context identifier associated with the prefetch request specifying the prefetch target address.

8. The apparatus according to claim 6, in which the address tag tracks addresses at a granularity corresponding to, or coarser than, a translation granule size with which address mappings are defined in a translation table structure accessed in the translation table walk.

9. The apparatus according to claim 1, in which the faulting address filter structure comprises a direct-mapped structure for which any given address maps to a single filter entry of the faulting address filter structure;
the tracking indication comprises a prefetch suppression indication settable to one of a suppression state and a non-suppression state; and
the faulting address prediction circuitry is configured to determine that the hit condition is satisfied for the prefetch target address when the filter entry of the direct-mapped structure corresponding to the prefetch target address specifies the prefetch suppression indication in the suppression state.

10. The apparatus according to claim 9, comprising prefetch suppression indication setting circuitry to set, in response to the memory management circuitry identifying the fault condition for a faulting address, the prefetch suppression indication of a selected filter entry corresponding to the faulting address to the suppression state.

11. The apparatus according to claim 10, in which the prefetch suppression indication setting circuitry is configured to set the prefetch suppression indication of at least one filter entry to the non-suppression state in response to at least one of:
the fault condition not being detected during a translation table walk for a given address corresponding to one of said at least one filter entry, or a hit being detected for the given address in a translation lookaside buffer (TLB) of the memory management circuitry;
a TLB invalidation request to request invalidation of at least one filter entry of the TLB;
a context switch; and/or
elapse of a predetermined period.

12. The apparatus according claim 1, in which the prefetch circuitry comprises at least one of:
data prefetching circuitry, where the information comprises data; and/or
instruction prefetching circuitry, where the information comprises at least one instruction.

13. An apparatus comprising:
memory management circuitry to perform a translation table walk for a target address of a memory access request and to signal a fault in response to the translation table walk identifying a fault condition for the target address;
prefetch circuitry to generate a prefetch request to request prefetching of information associated with a prefetch target address to a cache;
faulting address prediction circuitry to predict whether the memory management circuitry would identify the fault condition for the prefetch target address if the translation table walk was performed by the memory management circuitry for the prefetch target address; in which:
in response to the faulting address prediction circuitry predicting that the memory management circuitry would identify the fault condition for the prefetch target address if the translation table walk was performed for the prefetch target address, the prefetch circuitry is configured to suppress the prefetch request and the memory management circuitry is configured to prevent the translation table walk being performed for the prefetch target address of the prefetch request;

a faulting address filter structure comprising a plurality of filter entries, each filter entry storing a tracking indication for a corresponding subset of addresses; in which:

the faulting address prediction circuitry is configured to predict whether the memory management circuitry would identify the fault condition for the prefetch target address, based on whether a lookup of the faulting address filter structure for the prefetch target address identifies a hit condition for the prefetch target address; and faulting address filter structure updating circuitry to invalidate or clear at least one filter entry of the faulting address filter structure in response to an invalidation event, the invalidation event comprising at least one of:
- a translation lookaside buffer (TLB) invalidation request to request invalidation of at least one entry of a TLB of the memory management circuitry;
- a context switch; and/or
- elapse of a predetermined period.

14. An apparatus comprising:

memory management circuitry to perform a translation table walk for a target address of a memory access request and to signal a fault in response to the translation table walk identifying a fault condition for the target address;

prefetch circuitry to generate a prefetch request to request prefetching of information associated with a prefetch target address to a cache;

faulting address prediction circuitry to predict whether the memory management circuitry would identify the fault condition for the prefetch target address if the translation table walk was performed by the memory management circuitry for the prefetch target address; in which:

in response to the faulting address prediction circuitry predicting that the memory management circuitry would identify the fault condition for the prefetch target address if the translation table walk was performed for the prefetch target address, the prefetch circuitry is configured to suppress the prefetch request and the memory management circuitry is configured to prevent the translation table walk being performed for the prefetch target address of the prefetch request;

a faulting address filter structure comprising a plurality of filter entries, each filter entry storing a tracking indication for a corresponding subset of addresses; in which:

the faulting address prediction circuitry is configured to predict whether the memory management circuitry would identify the fault condition for the prefetch target address, based on whether a lookup of the faulting address filter structure for the prefetch target address identifies a hit condition for the prefetch target address;

the tracking indication comprises an address tag derived from an address for which the translation table walk identified the fault condition;

the faulting address prediction circuitry is configured to identify whether the hit condition is satisfied for the prefetch target address based on an address tag comparison of a target address tag derived from the prefetch target address with the address tag stored in at least one looked up filter entry of the faulting address filter structure; and each filter entry also specifies an address block size indication indicative of an address block size for a corresponding block of addresses, and the faulting address prediction circuitry is configured to adapt which bits are compared in the address tag comparison for a given looked up filter entry based on the address block size indication of the given looked up filter entry.

15. The apparatus according to claim 14, in which the address block size indication comprises a translation granule size indication indicative of a translation granule size associated with a translation table entry for which the translation table walk identified the fault condition.

16. The apparatus according to claim 14, in which the address block size indication comprises a translation table level indication indicative of a level of a hierarchical translation table structure at which the translation table walk identified a translation table entry which caused the fault condition to be identified.

* * * * *